(12) United States Patent
Heber

(10) Patent No.: US 11,454,841 B1
(45) Date of Patent: Sep. 27, 2022

(54) ILLUMINATION DEVICE FOR A SCREEN WITH AT LEAST TWO OPERATING MODES

(71) Applicant: siOPTICA GmbH, Jena (DE)

(72) Inventor: André Heber, Weimar (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 17/686,223

(22) Filed: Mar. 3, 2022

(30) Foreign Application Priority Data

Mar. 9, 2021 (DE) .................. 10 2021 105 595.4

(51) Int. Cl.
*G02F 1/1335* (2006.01)
*F21V 8/00* (2006.01)
*G02F 1/13357* (2006.01)

(52) U.S. Cl.
CPC ..... *G02F 1/133524* (2013.01); *G02B 6/0051* (2013.01); *G02F 1/133615* (2013.01)

(58) Field of Classification Search
CPC ......... G02F 1/133524; G02F 1/133615; G02B 6/0051
See application file for complete search history.

(56) References Cited

U.S. PATENT DOCUMENTS

| | | |
|---|---|---|
| 5,956,107 A | 9/1999 | Hashimoto et al. |
| 5,993,940 A | 11/1999 | Ouderkirk et al. |
| 6,765,550 B2 | 7/2004 | Janick et al. |
| 2004/0125592 A1 | 7/2004 | Nagakubo et al. |
| 2007/0076434 A1 | 4/2007 | Uehara et al. |
| 2008/0112187 A1 | 5/2008 | Katsumata et al. |
| 2008/0198295 A1 | 8/2008 | Yuuki et al. |
| 2012/0235891 A1 | 9/2012 | Nishitani et al. |
| 2013/0308185 A1 | 11/2013 | Robinson et al. |
| 2017/0069236 A1 | 3/2017 | Klippstein et al. |
| 2019/0369323 A1* | 12/2019 | Huang .................. G02F 1/1336 |
| 2021/0232278 A1 | 7/2021 | Heber et al. |

FOREIGN PATENT DOCUMENTS

| | | |
|---|---|---|
| DE | 10 2018 004 401 A1 | 12/2019 |
| EP | 2 317 495 A1 | 5/2011 |
| JP | 10-097199 A | 4/1998 |
| JP | 10-319242 A | 12/1998 |
| JP | 2004-192828 A | 7/2004 |
| JP | 2007-103062 A | 4/2007 |

(Continued)

*Primary Examiner* — Donald L Raleigh
(74) *Attorney, Agent, or Firm* — Christensen, Fonder, Dardi & Herbert PLLC

(57) ABSTRACT

An illuminating apparatus designed for a display screen and operable in at least two operating modes B1 and B2 and/or at least one operating mode B3 for illuminating separately two or simultaneously both, at least partially disjoint angular ranges W1 and W2, comprising a planar backlight unit, which in a first alternative radiates light into the said restricted angular range W2, and in a second alternative radiates light into a restricted angular range W2a, a plate-shaped light guide that is arranged in front of the backlight unit and features, on at least one of the large surfaces and/or within its volume, outcoupling elements, wherein the light guide is transparent to at least 70% of the light originating from the backlight unit, and light sources are arranged laterally on at least one of the narrow edges of the light guide.

20 Claims, 10 Drawing Sheets

(56) References Cited

FOREIGN PATENT DOCUMENTS

| | | |
|---|---|---|
| JP | 2007-155783 A | 6/2007 |
| JP | 2008-123925 A | 5/2008 |
| JP | 2008-235245 A | 10/2008 |
| WO | WO 2012/033583 A1 | 3/2012 |
| WO | WO 2012/144471 A1 | 10/2012 |
| WO | WO 2015/121398 A1 | 8/2015 |

\* cited by examiner

ILLUMINATION DEVICE FOR A SCREEN WITH AT LEAST TWO OPERATING MODES

PRIORITY CLAIM

The present application claims priority to German Patent Application No. 10 2021 105 595.4, filed on Mar. 9, 2021, which said application is incorporated by reference in its entirety herein.

FIELD OF THE INVENTION

In recent years, great strides have been made in enlarging the visual angle of LCDs. Frequently, however, there are situations in which such a very large angular viewing range of a display screen can be a disadvantage. Increasingly, information such as banking data or other private particulars and sensitive data is becoming available on mobile devices such as notebooks and tablet PCs. Accordingly, users require some control of who is allowed to see such sensitive data; they must be able to choose between a wide viewing angle in order to share information displayed on their display screen with others, e.g., when looking at vacation snaps or reading advertisements. On the other hand, they need a narrow viewing angle if they want to keep image information private.

A similar problem is encountered in vehicles: Here, when the motor is running, the driver must not be distracted by image contents such as digital entertainment shows, whereas a front-seat passenger would like to watch them during the ride. This requires a display screen that can be switched between corresponding display modes.

BACKGROUND

Accessory foils based on micro-louvers have already been used for mobile displays to provide them with visual data protection (a privacy mode). However, such foils had no facility for changeover switching but had to be applied and removed manually. In addition, they have to be carried separately from the display screen when not in use. A substantial disadvantage is the light loss accompanying the use of such louver foils.

U.S. Pat. No. 6,765,550 B2 describes such visual protection provided by micro-louvers. The chief disadvantages therein are the need to attach and remove the filter mechanically, and the light loss encountered in the privacy mode.

In U.S. Pat. No. 5,993,940 A, a privacy mode is achieved by means of a foil having small prism stripes regularly arranged on its surface. Designing and fabricating such a foil are rather complex tasks.

In WO 2012/033583 A1, switching between free and restricted viewing is effected by means of triggering liquid crystals between so-called "chromonic" layers. This is a rather complex process and entails a loss of light.

US 2012/0235891 A1 describes a very complicated backlight unit in a display screen. As shown in FIGS. 1 and 15 there, this features not only several light guides, but also further complex optical elements such as, e.g., microlens elements 40 and prism structures 50, which convert the light from the backlight unit on its way to the frontlight unit. This is expensive and complicated to realize and also involves loss of light. In accordance with the version illustrated in FIG. 17 in US 2012/0235891, the light sources 4R and 18 both produce light with a narrow lighting angle, with the light from the rear light source 18 being converted into light with a large lighting angle. This is a complex process and greatly diminishes brightness, as remarked above.

According to JP 2007-155783, special optical surfaces, which are designed and manufactured in a complicated process, are used to deflect light into varied narrow or wide ranges, depending on the angle of incidence. These structures resemble Fresnel lenses. Further, they have inactive edges, which deflect light into undesirable directions. Thus, it remains uncertain whether light distributions can be attained that actually make sense.

In US 2013/0308185 A1, a special light guide provided with steps is described, which radiates light on a large surface into various directions, depending on the direction from which it is illuminated from one of the edges. In interaction with a transmissive image generating device, e.g., an LC display, a display screen that is switchable between a free and a restricted viewing mode can be created. As a disadvantage, among others, the restricted viewing effect can be created either in a left/right arrangement only or in a top/bottom arrangement only, but not simultaneously for a left/right and top/bottom arrangement, as would be required for certain payment procedures. In addition, residual light remains visible from blocked viewing angles even in the restricted viewing mode.

The applicant's WO 2015/121398 A1 describes a display screen with two operating modes, wherein, for switching between operating modes, the said display screen essentially features scattering particles in the volume of the respective light guide. Made of a polymerizate, the scattering particles selected there have the disadvantage, as a rule, that the light is coupled out of both large surfaces, whereby about half the useful light is radiated into the wrong direction, i.e. toward the background illuminator, where, on account of the set-up, it cannot be recycled to a sufficient extent. Moreover, especially at a higher concentration, the polymerizate scattering particles distributed in the volume of the light guide may possibly lead to scattering effects that diminish privacy effects in the protected operating mode.

As a rule, the methods and arrangements outlined above have the disadvantage in common that they markedly reduce the brightness of the basic display screen and/or need a complex and expensive optical element for switching between the modes and/or do not make a dual-view mode possible and/or are limited in their black-and-white contrast.

Therefore, it is the problem of the present invention to describe an illuminating apparatus and an arrangement with a display screen that enables the defined viewing of image contents from specifiable angular ranges with the option of attaining the highest possible black-and-white contrast of the image. An added optional goal is to achieve the greatest possible tolerances as to the requirements for the illuminating apparatus regarding the residual light in regions not to be illuminated.

SUMMARY

According to the invention, this problem is solved by an illuminating apparatus intended for a display screen and operable in at least two operating modes B1 and B2 and/or at least one operating mode B3 for illuminating one of two (B1, B2), or simultaneously both (B3), at least partially disjoint angular ranges W1 and W2, comprising
    a backlight unit of planar extension, which, in a first alternative, radiates light into the said restricted angular range W2 and, in a second alternative, radiates light into a restricted angular range W2a, a plate-shaped light guide that is situated in front of the backlight unit (seen in the viewing direction) and features outcoupling elements on at least one of the large surfaces and/or within its volume, wherein the light guide is transparent to at least 70% of the light originating from the backlight unit, light sources arranged laterally on at least one of the edges of the light guide, the light sources being, e.g., LEDs or a structured light guide for outcoupling in its turn the light of, e.g., LEDs illuminating it, wherein the number of outcoupling elements per unit area and their extension are chosen so that the light guide, on at least 50% of its area, scatters at most 25%, preferably at most ten % of the light penetrating its large surfaces by more than ten degrees (preferably only 7°, with particular preference only 5°), whereby, at least in operating mode B2, the light radiated by the backlight unit into a restricted angular range W2 or W2a, when it passes the light guide, is scattered not more than slightly outside the said angular range W2 or W2a, wherein, furthermore, a distribution of the outcoupling elements is, on at least one of the large surfaces and/or within the volume of the light guide, is specified to the effect that light radiated by the light sources into the light guide and coupled out of the light guide by the outcoupling elements is radiated into a restricted angular range W1a while at least 40% (preferably 50% or more than 50%) of the amount of light coupled out of the light guide is coupled out in a direction away from the backlight unit, wherein, in the first alternative, the restricted angular range W1a equals the said restricted angular range W1, and wherein, in the second alternative, the light coupled out of the light guide into the restricted angular range W1a is imaged and/or deflected by one or several optical layers positioned (as seen in the viewing direction) in front of the plate-shaped light guide in such a way that it is eventually radiated into the restricted angular range W1, and wherein, in the second alternative, the one or several optical layers deflect the light originating from the backlight unit in such a way that it is eventually radiated into the restricted angular range W2, wherein, finally,
i: is in operating mode B1, provided that it is implemented, the light sources are switched on and the backlight unit is switched off;
ii. in operating mode B2, provided that it is implemented, the backlight unit is switched on and the light sources are switched off;
iii. in operating mode B3, provided that it is implemented, both the light sources and the backlight unit are switched on.

Herein, the term "angular range" generally means a defined solid angle in which a particular luminance profile is radiated.

Concerning this, it should be noted that "disjoint", in the sense of this invention, is intended to mean that the directions of the peak brightnesses (i.e., maximum luminances) of the two angular ranges W1 and W2 do not tally. Optionally, the term "disjoint" can have the added (and preferred) meaning that maximally 50%, 30%, 15%, 10%, 2%, 1% or 0.5% (or other values) of the peak brightness of an angular range W1 or W2 are radiated into the second angular range W2 or W1. In other words, the illuminations of the two disjoint angular ranges are only partially overlapping. Moreover, the property that the number of outcoupling elements per unit area and their extension are chosen so that the light guide, on at least 50% of its area, scatters at most 25%, preferably at most ten % of the light penetrating its large surfaces by more than ten degrees (preferably only 7°, with particular preference only 5°): that this property does not mean, in particular, that due to the outcoupling elements, e.g., due to prismatic outcoupling elements, light is systematically deflected by a particular angle; since such deflection by a particular angle could, as a rule, be compensated by a prism array (aka turning film). The above definition rather relates to the light actually scattered by the outcoupling elements (as a rule, purely by chance), which causes a—mostly unwanted—spreading of the full width at half maximum of the light penetrating the light guide.

Additionally or alternatively, the number of outcoupling elements per unit area and their extension can be chosen to the effect that the light guide, on at least 50% of its area has an average haze value smaller than 18%, preferably smaller than 10%, measured according to ASTM D1003 (Method A by means of a haze meter).

Thus, depending on its configuration, the illuminating apparatus 1a can offer the following operating modes:
a choice of B1 and B2 only,
B3 only,
a choice of B1, B2 or B3.

Preferably, the luminance profiles radiated into the angular ranges W1 and W2 have different full widths at half maximum (FWHM) of preferably 10° to 40°, or, with particular preference, 15° to 35° in the horizontal measuring direction. Here, let the horizontal be defined as a reference direction positioned parallel to the bottom edge of the backlight unit.

Advantageously, the light guide can consist of a transparent polymer, preferably of a thermoplastic or thermoelastic material or of glass.

Preferably, the distribution of the outcoupling elements on at least one of the large surfaces and/or within the volume of the light guide is specified to the effect that the light coupled out attains a luminance homogeneity of at least 70%, determined by means of a 9-point measurement.

The required properties of the outcoupling elements that are essential for the invention, regarding their number per unit area, their form and extension in three dimensions as well as their distribution on at least one of the large areas and/or within the volume of the light guide can be determined, e.g., by means of an optical simulation software—such as, e.g., "Light Tools" made by Synopsis or other suppliers—and then be implemented physically.

Typically, but not exclusively, the outcoupling elements have maximum dimensions of 100 μm, preferably they measure between 1 μm and 30 μm. They consist, e.g., of microlenses and/or microprisms and/or diffractive structures and/or holograms and/or three-dimensional structural elements and/or scattering elements.

Alternatively, the outcoupling elements can be arranged within the volume of the light guide, in which case they are configured as cavities or refractive index differences that preferably behave like microlenses, microprisms or diffractive structures on surfaces. For that purpose, the cavities are filled with a gaseous, liquid or solid material, the material having a refractive index differing from, preferably being lower than, that of the material used for the light guide. Alternatively, the cavities can be evacuated or. filled with air.

Furthermore it is possible for the cavities to be filled with a gaseous, liquid or solid material, the material having a haze value differing from, preferably being higher than, that of the material used for the light guide.

In this connection it is further possible for the light guide to be made of two substrate layers preferably of the same kind, which are joined at interfaces, and for the cavities, as material recesses on at least one of the interfaces, preferably to have the outer shape of microlenses, microprisms, three-dimensional structural elements of diffractive structures.

If they are provided on at least one of the large surfaces or interfaces of the light guide, the outcoupling elements can preferably be made of polymer or transparent material—preferably plastic or glass—structured by a mechanical, lithographical, printing, material-depositing, material-removing, material-transforming or material dissolving process.

The backlight unit consists of, e.g.,
a planar emitter, preferably a light guide with light sources arranged laterally or on the rear side (so, it may also be a so-called "direct-lit backlight unit");
optionally, at least one light collimator integrated in the planar emitter and/or arranged in front of the same.

From back to front (as seen in the viewing direction), the backlight unit may contain, e.g.,
a planar reflector,
a planar light guide used as a planar radiator,
a planar diffuser,
optionally one or two crossed prism arrays known as BEF,
optionally one prism array known as turning film,
optionally a reflecting polarizer, e.g. of the 3M™ DBEF™ type,
optionally a privacy film (e.g., a louver film) of the 3M™ LCF or ShinEtsu VCF type.

Furthermore, a diffuser (isotropic or anisotropic) may optionally be employed in a selectable place in the stack to hide optical defects, and/or to optimize the FWHM of the illuminance distribution.

Instead of the three layers right at the back (reflector, light guide and diffuser) one can use a direct-lit backlight unit.

Furthermore it may be advantageous if, for the operating mode B1, depending on the specified critical angles $\sigma$, $\gamma$, the light coupled out and exiting from the light guide at an angle $\beta$—at every point of the surface of the light guide in angular ranges satisfying the requirements $80°>\beta>\gamma$ and/or $-80°<\beta<-\sigma$, with $10°<\gamma<80°$ and $10°<\sigma<80°$, preferably $\gamma=\sigma=20°$, measured normal to the surface of the light guide and in at least one of the two preferred directions—exhibits maximally 80° or, with particular preference, maximally 50° of the luminosity of the light exiting at such a point of the surface of the light guide in any direction with maximum luminosity.

Preferably, the invention is developed into an arrangement in a first embodiment, consisting of an illuminating apparatus according to the invention as described above, and a display screen arranged in front of it as seen in the viewing direction, wherein the display screen comprises at least one transmissive screen, preferably an LCD panel including an electronic control unit, for the defined representation of image contents on the display screen.

Further, in case such a display screen is provided with pixels that in turn are composed of subpixels, it may be advantageous if every dimension of the outcoupling elements (height, depth and width) is smaller than the minimum of width and height of the screen subpixels.

With particular preference, the display screen can be operated at least in a dual-view mode, which permits viewing, simultaneously or in a time sequence, two different images L, R from two different, at least partially disjoint angular ranges R1 and R2.

For special embodiments, an additional light guide, also preferably provided with means for light outcoupling and receiving light laterally from further light sources, may be arranged in front of the display screen (as seen in the viewing direction). This may possibly dissolve any (unavoidable) residual light radiated laterally.

In this connection, in an arrangement of a first embodiment, a dual-view mode permitting to simultaneously view two different images from different, at least partially disjoint angular ranges R1 and R2, is implemented in such a way that a prism array and/or a lenticular array and/or a barrier screen having a transparent-opaque pattern with a period P is arranged in front or behind the display screen, and that furthermore, if two mutually periodically interleaved image contents L, R are presented on the display screen, wherein the period PB of the interleaved image contents L, R presented on the display screen tallies with the said period P except a tolerance of maximally three percent, the image contents L, R can predominantly be seen from the angular ranges R1, R2, with the illuminating apparatus operating in operating mode B3, and preferably with the angular ranges R1 and W1, or R2 and W2, respectively, overlapping to a high degree.

"Overlapping to a high degree", e.g., of the angular ranges R1 and W1 is the case, if at least half of the total light amount radiated in the angular range W1 is radiated into the angular range W1. However, other definitions are possible, if necessary, with less or more than half of the said light amount.

This first embodiment has the special advantage that the requirements regarding the backlight unit or the light guide, respectively, i.e., to radiate the least possible residual light outside their respective angular ranges W2 or W1, can be chosen with a relatively generous tolerance. Due to the combination with a dual-view panel as a display screen, which itself typically exhibits little crosstalk of light between the ranges R1 and R2—mostly of a few percent only, e.g., 1%—, it is sufficient if—as described above—maximally e.g. 10% of the peak brightness of one angular range W1 or W2 is radiated into the second angular range W2 or W1, respectively. This would mean that the crosstalk of the display screen, here set to be 1%, for example, is reduced by another factor of (at least) 10, since the crosstalk in the backlight unit amounts to maximally 10%.

In that way, the dual mode can be markedly improved as far as crosstalk is concerned, since a direction-selective illumination is already within the scope of the illumination apparatus. Nevertheless, the technical implementation of the above-mentioned exemplary demand on the invented illumination apparatus, namely that maximally 10% of the peak brightness of one angular range W1 or W2 is radiated into the second angular range W2 or W1, respectively, is markedly easier to achieve than, e.g., in privacy applications, where maximally 1% or less of the peak brightness of an angular range may get into the angular range complementary to it.

The above-described arrangement of the first embodiment can be developed into a second embodiment, in which a component of planar extension, arranged in front or behind the display screen (as seen in viewing direction) and featuring a great number of segments transmitting the light incident on it with a transmittance selectable between a maximum and a minimum value, in order to improve the black-and-white contrast by local dimming.

The surface areas of the segments may approximately be of nearly the same size as that of the planar component, which transmit light incident on them with a transmittance selectable between a maximum and a minimum, may be of nearly the same size as the surface area of a pixel or a subpixel of the display screen. Preferably, though, the surfaces of the segments are of a size corresponding to the size of whole clusters of pixels, so that, in case of parallel projection along the vertical bisector of the display screen, a segment covers a defined number of screen pixels. These segments may, e.g. of a rectangular shape covering, in the said parallel projection, about 5×5, 10×5, 5×10, 20×20, 30×30, 10×20, 20×10, 50×50, 100×50 or 50×100 pixels. Areas of other sizes and/or shapes are possible.

With particular preference, the transmittances of the respective segments of the planar component are controlled depending on the image content shown on the display screen, especially by the said electronic screen control. Due to the locally selectable transmittances, then, the purpose of the planar component with the segments is, especially, to improve the black-and-white contrast, wherein a local dimming approach takes effect.

For example, the segments displaying the dark parts of an image content can be triggered with a low transmittance, whereas the segments displaying the bright parts are triggered with a high transmittance. Further details of local dimming approaches are known to experts in the art and need no further explanation.

The planar component can comprise, e.g., a liquid crystal panel with polarizers in order to achieve the defined local dimming, i.e., the setting of transmittances. If the display screen is an LCD panel, one of the polarizers of the planar component can, at the same time, form a polarizer of this panel, wherein the planar component behind the display screen can preferably be configured together with the display screen as one single module. Other embodiments of the planar component are also possible, of course, using, e.g., electrochromism, electrowetting, electrophoresis, magnetophoresis or other principles acting in optical engineering.

Varying with embodiments, the transmittances achievable in the segments (if measured normal to the surface with mixed white light) are between <0.001% and 50% or more, as a rule.

The second embodiment can now be developed into an arrangement in a third embodiment, wherein the planar component, on a genuine selection of segments, represents a (transparent-) opaque pattern of a barrier screen with the period P, and implements, on a complementary selection of segments, a selectable or maximum transmittance, and wherein the period PB of the interleaved image contents L, R displayed on the display screen tallies with the said period P with the exception of a tolerance of maximally three percent, so that each of the said image contents L, R can prevailingly be seen from different angular ranges R1, R2.

A "genuine" selection of segments means that you do not select all segments at a time, nor none of the segments.

Here it should be noted that, in principle, the image contents L and R may differ from each other, but also be identical. In case of identity, different viewers staying in different angular ranges R1 and R2 will see the same image content.

Here, the explanations given above on the size of the segments apply analogously.

The said transparent-opaque pattern of a barrier screen means that the selection of segments is switched to maximum transmittance, whereas the transmittance of the complementary segments of the planar component is selectable, this transmittance preferably being set by way of the above-mentioned local dimming mechanisms or switched to maximum transmittance to get the highest possible brightness.

The optical design of the prism array, the lenticular array, or the barrier screen with a transparent-opaque pattern, each with a period P, is known to the expert, taking into account especially the desired angular ranges R1 and R2, the dimensions (and positions) of the display screen pixels, and in particular, of the period PB in interleaving the image contents L, R, the period P of the refractive indices involved (e.g., for prism and lenticular arrays, and the cover glass of the LCD panel); and the general geometric situations.

Here it is advantageous if the respective period boundaries of the prism array, the lenticular array or the barrier screen (depending on which of these is provided) in case of parallel projection tally with the period boundaries of the respective two image contents L, R mutually periodically interleaved on the display screen, with the exception of a tolerance of maximally 300 µm, preferably maximally 100 µm.

As a mathematical relationship between the periods P and PB, one can have resort to the parallax barrier conditions known to the expert.

Here, a particularly outstanding means-effect relationship is given by the fact that the contrast-enhancing layer, i.e., the planar component, simultaneously contributes to the light direction selecting effect, i.e., to the optical generation of the angular ranges R1 and R2.

In an arrangement of the third embodiment, the display screen can comprise an added mode, in which it displays only one image content L, wherein the planar component is used as a local dimming panel and the illuminating apparatus is operated in the operating mode B3. Thus, the image content L is visible fully resolved from the angular ranges R1 and R2.

The special advantage of the second and third embodiments, compared to prior art, is the fact that, due to the planar component, an enhanced black-and-white contrast of the image can be offered. The implementation, e.g., with a prism array and a liquid crystal panel with polarizers as a planar component can be effected at reasonable cost.

In an arrangement of the third embodiment it is further possible for the display screen to be operated in a dual-view mode, in which one image content L is dynamically freely selectable, whereas the other image content R is a selectable but static image content and preferably is a black or white or monochrome surface, wherein the illuminating apparatus is operated in the B1, B2 or B3 operating mode. Depending on the visibility of the image content L in the angular range R1 or R2, then, nothing or almost nothing of the image content L would be visible in the respective other angular range R2 or R1, respectively. This non-visibility would be augmented by the fact that the image content R is a static one, which would, as far as possible, dissolve any residual light of the image content L in the angular range of the image content R.

Furthermore, the second embodiment of the arrangement can be developed into a fourth embodiment, in which, for a dual-view mode permitting to sequentially view two different images L, R from two different, at least partially disjoint angular ranges R1 and R2, at least two clock pulses T1, T2 are periodically implemented in succession, wherein
    in each clock pulse T1, T2, two periodically interleaved image contents L, R are displayed on the display screen, and interleaving of the image contents L, R alternates between the clock pulses T1, T2, and wherein a planar component in front of and behind the display screen displays, on a genuine selection of segments, an opaque pattern of a barrier screen with the period P, and on a complementary selection of segments implements a selectable or maximum transmittance each, during which the said selections of segments alternate between the clock pulses T1, T2, and whereas the period PB of the interleaved image contents L, R, when displayed on the display screen, tallies with the said period P, with the exception of a tolerance of maximally three percent, and the illuminating apparatus operates in operating mode B3, so that the said image contents L, R can each be seen predominantly from different angular ranges R1, R2 and, on a time average, with the display screen fully resolved.

The frequency at which the clock pulses T1 and T2 alternate here, should at least be 60 Hz, or preferably yet higher. This also applies to clock pulse-controlled embodiments described below.

Lastly, the second embodiment of the arrangement can be developed into a fifth embodiment, in such a way that, for a dual-view mode permitting to sequentially view two different images L, R from two different, at least partially disjoint angular ranges R1 and R2, at least two clock pulses T1, T2 are periodically implemented in succession, wherein the display screen displays image content L in clock pulse T1, and image content R in clock pulse T2 (this allocation of clock pulses to image contents applies without loss of generality and can be exchanged, of course), and wherein optionally, a planar component arranged in front or behind the display screen (as seen in viewing direction) with segments that transmit light incident on them, each with a transmittance selectable between a minimum and a maximum value, in order to enhance the black-and-white contrast by local dimming, and wherein the illuminating apparatus is operated in operating mode B1 during clock pulse T1 and in operating mode B2 during clock pulse T2 (this allocation of clock pulses to operating modes applies without loss of generality and can be exchanged, of course), and whereas further preferably, the angular ranges R1 and W1 or R2 and W2, respectively, overlap to a high degree (for the definition of "overlapping to a high degree", see above, so that each of the said image contents L, R can predominantly be seen from different angular ranges R1, R2, with the display screen fully resolved.

Optionally, for all embodiments of the invention described above, one of the angular ranges R1 or R2 may, at least partially include a half plane that extends through the centroid of the imaging area of the display screen with the exception of a tolerance of a few, or also quite a few, millimeters, is normal to the imaging area of the display screen save for a tolerance of a few degrees, and, at the same time, is aligned parallel to the left margin of the imaging area of the display screen save for a tolerance of a few degrees.

As a matter of course, all image contents L, R in all embodiments may be still images, moving images and/or text or other visual contents.

The invention also includes the use of an arrangement according to the invention or an illuminating apparatus according to the invention inside a vehicle, wherein the driver, provided that he is situated outside one of the angular ranges R1 or R2, sees the image content displayed in this restricted angular range R1 or R2 with maximally two percent, or preferably less than one percent, of its peak brightness.

The vehicle eligible herein may generally be a motor road vehicle, a ship, a rail-borne vehicle, an air plane or a spacecraft.

Moreover, according to the dimensioning of the different angular ranges it is principally possible, with all above-described embodiments featuring a dual-view mode, to obtain stereoscopic image contents L, R displayed in three dimensions without requiring spectacles. For that purpose, the angular ranges R1 and R2 need to border on each other in such a way that the right and left eyes of a viewer, or possibly several viewers, see different image contents.

On principle, the performance of this invention remains unaffected even if the parameters described above are varied within certain limits.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying drawings, which also show features essential to the invention, and in which.

DETAILED DESCRIPTION

The drawings are not to scale and merely illustrate principles. Also, for the sake of clarity, they only show a small selection of light rays, as a rule, whereas in reality there exist a great many of them.

Figure 1A:
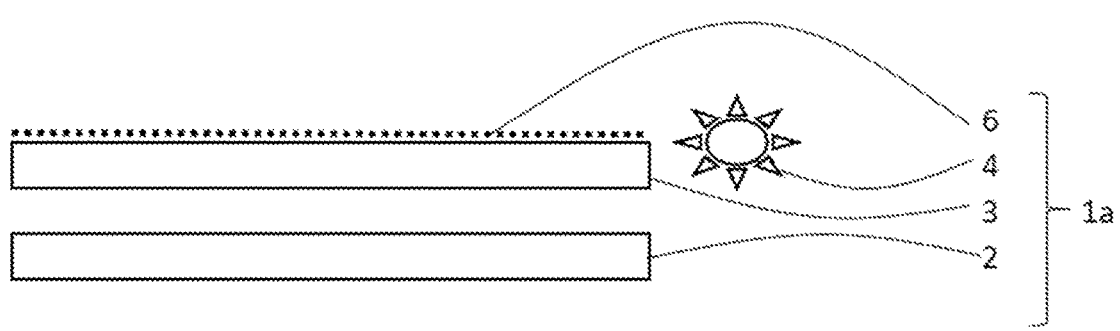
FIG. 1A is a sketch illustrating the principle of an illuminating apparatus.

FIG. 1A is a sketch of the principle of an illuminating apparatus 1a for a display screen 1, wherein the said illuminating apparatus can be operated in at least two operating modes B1 and B2 and/or at least one operating mode B3 for illuminating either one of two at least partially disjoint angular ranges W1 and W2 singly (B1, B2) or both of them simultaneously (B3), comprising a backlight unit 2 of planar extension, which, in a first alternative, radiates light in the said restricted angular range W2 and, in a second alternative, radiates light in a restricted angular range W2a, a plate-shaped light guide 3 that is situated in front of the backlight unit 2 (seen in the viewing direction) and features outcoupling elements 6 on at least one of its large surfaces and/or within its volume, wherein the light guide 3 is transparent to at least 70% of the light originating from the backlight unit 2, light sources 4 arranged laterally on at least one of the edges of the light guide 3, the light sources being, e.g., LEDs or a structured light guide for outcoupling in its turn the light of, e.g., LEDs illuminating it, wherein the number of outcoupling elements 6 per unit area and their extension are chosen so that the light guide, 3 on at least 50% of its area, scatters at most 25%, preferably at most ten % of the light penetrating its large surfaces by more than ten degrees (preferably only 7°, with particular preference only 5°), whereby, at least in operating mode B2, the light radiated by the backlight unit 2 in a restricted angular range W2 or W2a, when it passes the light guide 3, is scattered not more than slightly outside the said angular range W2 or W2a, wherein, furthermore, a distribution of the outcoupling elements 6 is, on at least one of the large surfaces and/or within the volume of the light guide 3, is specified to the effect that light radiated by the light sources 4 into the light guide 3 and coupled out of the light guide 3 by the outcoupling elements 6 is radiated into a restricted angular range W1a while at least 40% (preferably 50%) of the amount of light coupled out of the light guide 3 is coupled out in a direction away from the backlight unit, wherein, in the first alternative, the restricted angular range W1a corresponds to the said restricted angular range W1, and wherein, in the second alternative, the light coupled out of the light guide 3 into the restricted angular range W1a is imaged and/or deflected by one or several optical layers 5b situated (as seen in the viewing direction) in front of the plate-shaped light guide 3 in such a way that it is eventually radiated into the restricted angular range W1, and wherein, in the second alternative, the one or several optical layers deflect the light originating from the backlight unit 2 in such a way that it is eventually radiated into the restricted angular range W2, wherein, finally, i: is in operating mode B1, provided that it is implemented, the light sources 4 are switched on and the backlight unit 2 is switched off;

ii. in operating mode B2, provided that it is implemented, backlight unit 2 is switched on and the light sources 4 are switched off;

iii. in operating mode B2, provided that it is implemented, both the light sources 4 and the backlight unit 2 are switched on.

Here, "angular range" generally means a defined solid angle into which a particular luminance profile is radiated. An example thereof is illustrated FIG. 1G. The drawing shows a normalized luminance profile of an illuminating apparatus 1q with a restricted angular range W1 that has a peak brightness at 0° and a full width at half maximum (FWHM) of about 24°, and a restricted angular range W2 that has a peak brightness at 45° and an FWHM also of about 24°. (Here, the horizontal is meant to be defined as a reference direction, positioned parallel to the bottom edge of the backlight unit 2.)

As a matter of course, an angular range also extends in the vertical direction, where the FWHM may have similar values.

Although, in the drawing 1a and other drawings, the outcoupling elements are attached to the front surface (as seen in the viewing direction) of the light guide 3, they can also (or only) be attached to the rear surface of the light guide 3, or to both the front and rear surfaces of the light guide and/or in its volume.

Figure 1B:
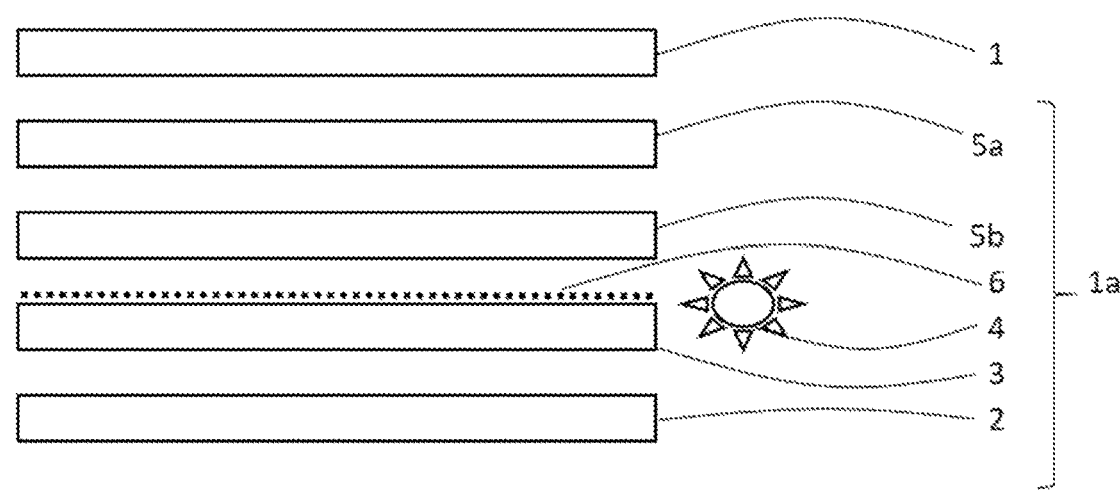
FIG. 1B is a sketch illustrating the principle of an arrangement consisting of an illuminating apparatus and a display screen.

Preferably, the invention is developed into an arrangement in a first embodiment, consisting of an illuminating apparatus according to the invention 1a as described above, and a display screen arranged in front of it (as seen in the viewing direction). Herein, the display screen comprises at least one transmissive screen, preferably an LCD panel, including an electronic control unit for the defined presentation of image contents on the display screen. FIG. 1B illustrates the principle of an arrangement, consisting of an illuminating apparatus 1a and a display screen 1.

Furthermore, if such a display screen 1 is used with pixels that are composed of subpixels, it can be an advantage to have each dimension of the outcoupling elements 6, i.e., height, depth and width smaller than the minimum from width and height of the said subpixels.

As an LCD panel for the display screen 1, principally every type of LCD technology is eligible, such as, e.g., FFS, IPS, VA or TN or others. The restricted angular ranges as well as a dual-view mode will take advantage from a display screen 1 having the least possible volume scattering, so that directional light penetrating it is fanned out as little as possible by scattering, "little" meaning, e.g., that—due to the low haze level—in a relative angle of e.g., horizontal 40° from the surface normal, maximally 1% of the luminosity is added by scattering radiated by the background unit in the direction of the peak luminosity (e.g., at a horizontal angle of 0°). In other words: The unwanted scattering of the LCD panel, at least in the horizontal direction, should be as little as possible.

Typically, the color subpixel sizes of an LCD panel are within a range of a few up to some tens of micrometers. However, the invention is by no means bound by this.

Electronic control units for LCD panels and backlight units are generally known to persons skilled in the art and do not require further explanation.

The background unit 2 consists of, e.g.,
- a planar radiator, preferably a light guide 2 with light sources arranged laterally or on the rear side, which are not shown in this drawing (the planar radiator may be, e.g., a direct lit backlight unit), and
- optionally at least one light collimator, e.g., a prism array, integrated in and/or arranged in front of, the planar radiator.

From back to front (as seen in the viewing direction), the backlight unit may contain, e.g.,
- a planar reflector,
- a planar light guide 3 with outcoupling elements 6 and laterally arranged light sources 4,
- a planar diffuser,
- optionally one or two crossed prism arrays known as BEF,
- optionally one prism array 5b known as turning film,
- optionally a reflecting polarizer, e.g. of the 3M™ DBEF™ type,
- optionally a privacy film of the 3M™ LCF or ShinEtsu VCF type.

Furthermore, a diffuser 5a (isotropic or anisotropic) may optionally be employed in a selectable place in the stack to hide optical defects, and/or to optimize the FWHM of the illuminance distribution.

Instead of the rear light guide one can use an LED matrix. In that case one needs to effect various modifications to the optical layers, which are known to persons skilled in the art.

Depending on its configuration, the illuminating apparatus 1a can offer the following operating modes:
- a choice of B1 and B2 only,
- B3 only,
- a choice of B1, B2 or B3.

Advantageously, the light guide 3 can consist of a transparent polymer, preferably of a thermoplastic or thermoelastic material or of glass.

Preferably, the distribution of the outcoupling elements 6 on at least one of the large surfaces and/or within the volume of the light guide 3 is specified to the effect that the light coupled out attains a luminance homogeneity of at least 70%.

The required properties of the outcoupling elements 6 that are essential for the invention, regarding their number per unit area, their form and extension in three dimensions as well as their distribution on at least one of the large areas and/or within the volume of the light guide can be determined, e.g., by means of an optical simulation software—such as, e.g., "Light Tools" made by Synopsis or other suppliers—and then be implemented physically.

Typically, but not exclusively, the outcoupling elements 6 have maximum dimensions of 100 μm, or; preferably between 1 μm and 30 μm. They consist, e.g., of microlenses and/or microprisms and/or diffractive structures and/or holograms and/or three-dimensional structural elements and/or scattering elements.

Furthermore it may be advantageous if, for the operating mode B1, depending on the specified critical angles $\sigma$, $\gamma$, the light coupled out and exiting from the light guide 3 at an angle $\beta$—at every point of the surface of the light guide 3 in angular ranges satisfying the requirements $80°>\beta>\gamma$ and/or $-80°<\beta<-\sigma$, with $10°<\gamma<80°$ and $10°<\sigma<80°$, preferably $\gamma=\sigma=20°$, measured normal to the surface of the light guide 3 and in at least one of the two preferred directions—exhibits maximally 80° or, with particular preference, maximally 50° of the luminosity of the light exiting at such a point of the surface of the light guide 3 in any direction with maximum luminosity.

Figure 1C:
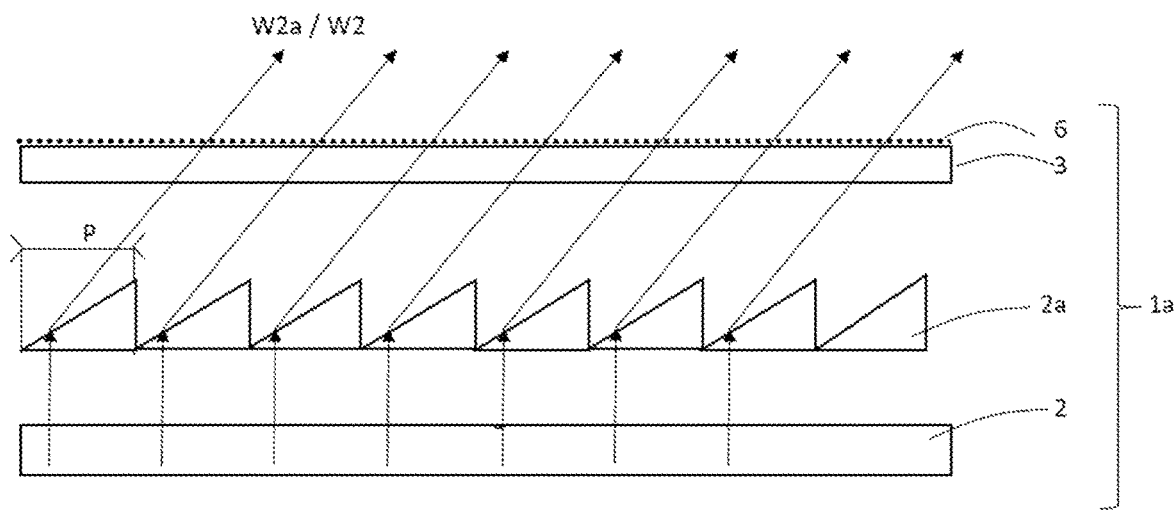
FIG. 1C is a sketch illustrating the principle of an illuminating apparatus in the operating mode B2 and embodied according to a first alternative.
Figure 1D:
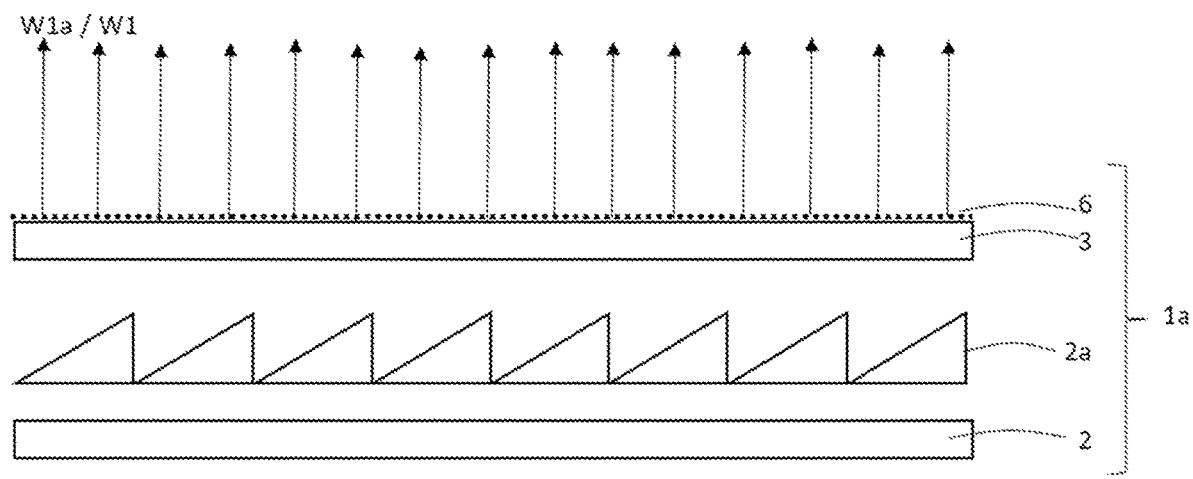
FIG. 1D is a sketch illustrating the principle of an illuminating apparatus in the operating mode B1 and embodied according to a first alternative.

Further, an illuminating apparatus 1a in the B2 operating mode is illustrated in FIG. 1C, and an illuminating apparatus 1a in the B1 operating mode is illustrated in FIG. 1D, each as embodied in a first alternative.

It applies to either case that
in the first alternative, a planar backlight unit 2 radiates light into the said restricted angular range W2 (operating mode B2, see FIG. 1C),
wherein a distribution of the outcoupling elements 6 on at least one of the large surfaces and/or within the volume of the light guide 3 is specified to the effect that the light radiated by the light sources 4 into the light guide 3 and light coupled out from the light guide 3 by the outcoupling elements is radiated into a restricted angular range W1 a (operating mode B1, see FIG. 1D), wherein at least 40% (preferably 50%) of the light amount coupled out of the light guide 3 is coupled out in a direction away from the backlight unit 2,
wherein, in the first alternative, the restricted angular range W1a corresponds the said restricted angular range W1,
and wherein, finally,
  i: is in operating mode B1 (FIG. 1F), provided that it is implemented, the light sources 4 are switched on and the backlight unit 2 is switched off;
  ii. in operating mode B2 (FIG. 1C), provided that it is implemented, the backlight unit 2 is switched on and the light sources 4 are switched off;
  iii. in operating mode B3 (not shown in the drawing), provided that it is implemented, both the light sources 4 and the backlight unit 2 are switched on.

In some of the drawings, the angular ranges W1a, W1, W2a and W2 are represented by arrows only. These are meant to represent the propagation direction of the peak brightness (projected onto the drawing plane). In reality, however, the angular ranges are not arrow-like but limited fan-shaped ranges, as described above with reference to their FWHM.

In particular, the light guide 2 can couple out light directly in the direction of W2a or W2, respectively, even with no prism array 2a provided.

Figure 1E:
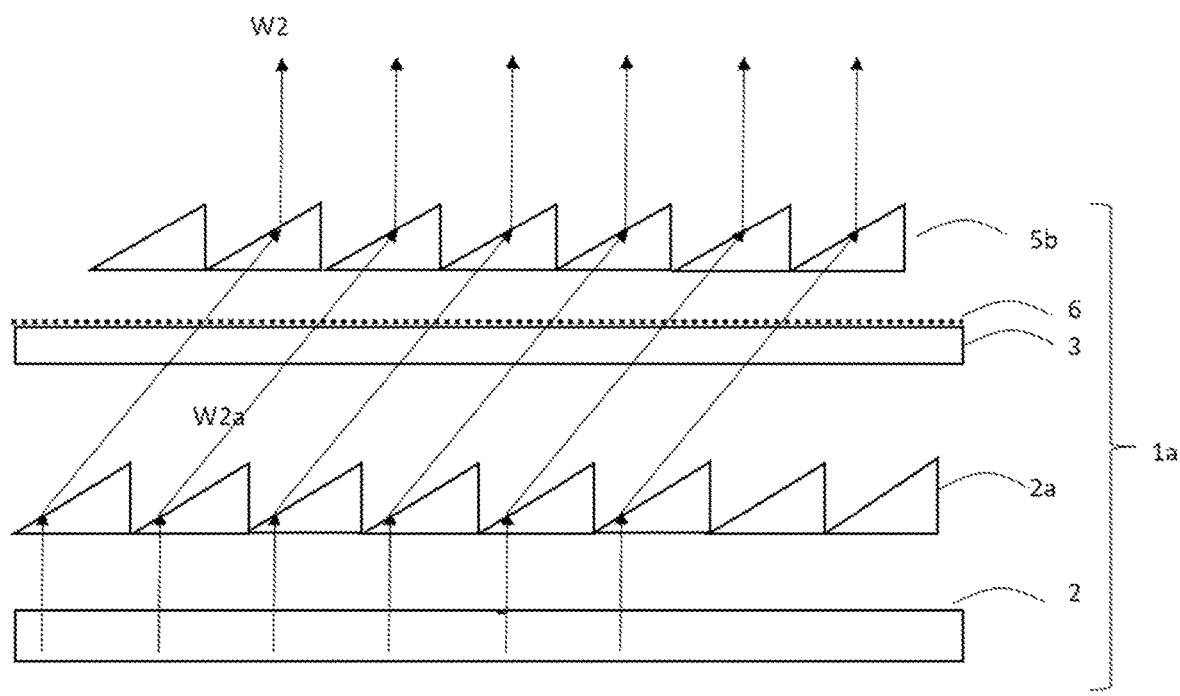
FIG. 1E is a sketch illustrating the principle of an illuminating apparatus in the operating mode B2 and embodied according to a second alternative.
Figure 1F:
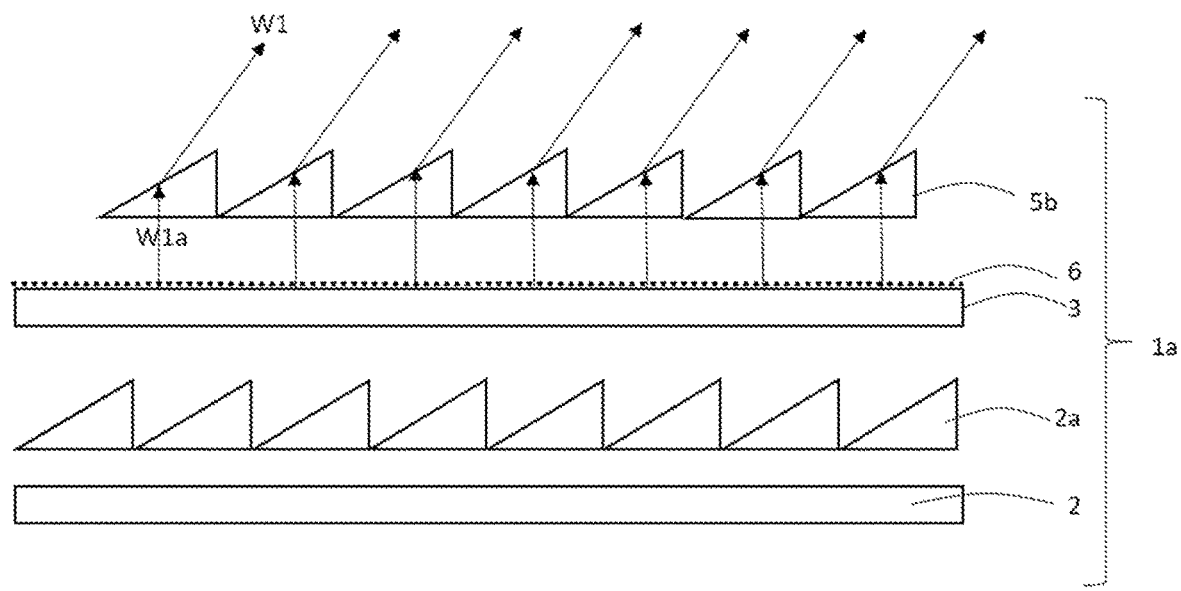
FIG. 1F is a sketch illustrating the principle of an illuminating apparatus in the operating mode B1 and embodied according to a second alternative.
Figure 1G:
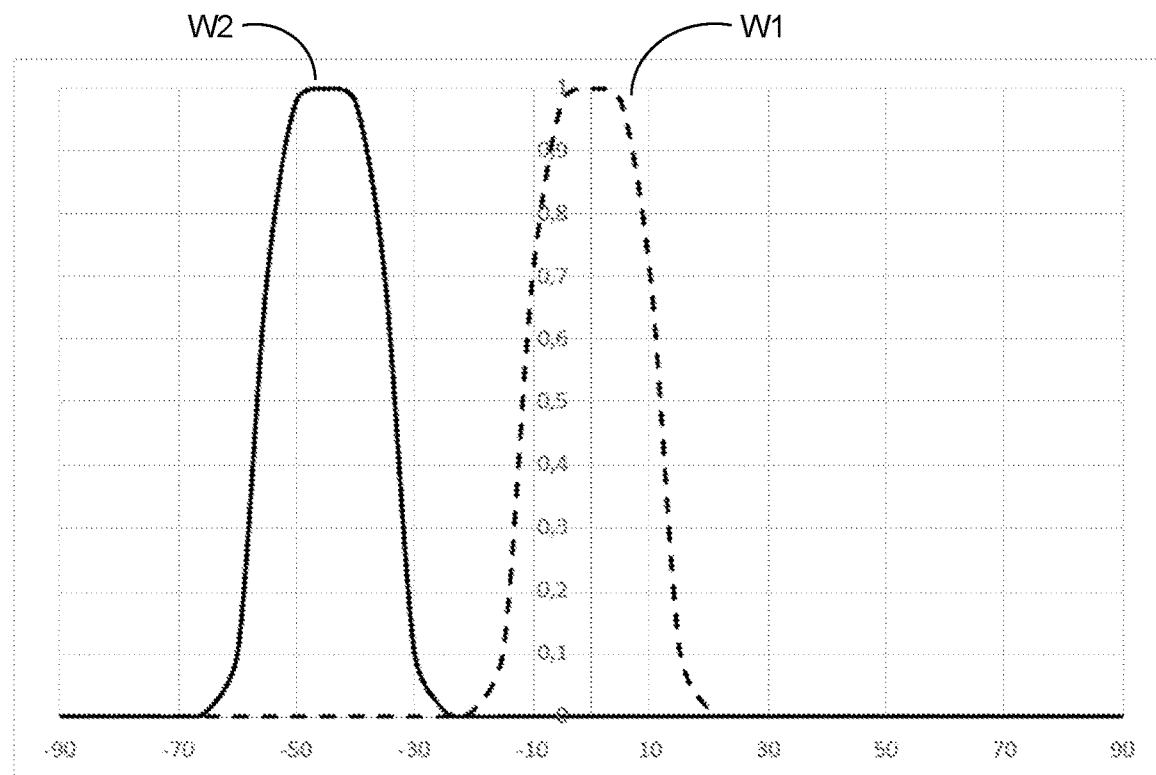
FIG. 1G is a sketch illustrating the principle of the luminance distribution of two disjoint angular ranges, measured in a horizontal direction.

Compared with this, FIG. 1E illustrates the principle of an illuminating apparatus in operating mode B2, and FIG. 1F does illustrates such an illuminating apparatus in operating mode B1, either one in an embodiment according to the second alternative.

In either case,
  a planar backlight unit 2 in the second alternative radiates light into a restricted angular range W2a,
  a distribution of the outcoupling elements 6 on at least one of the large surfaces and/or within the volume of the light guide 3 is specified to the effect that light radiated by the light source into the light guide 3 and coupled out from the light guide 3 by the outcoupling elements 6 is radiated into a restricted angular range, wherein at least 40% (preferably 50%) of the light amount coupled out from the light guide 3 is coupled out in a direction away from the backlight unit 2, and that
  in the second alternative, the light coupled out from the light guide 3 into the restricted angular range W1a is images and/or deflected by one or several optical layers 5b (e.g., prism arrays, especially a turning film) situated in front of the plate-shaped light guide (as seen in the viewing direction), in such a way that it is finally radiated into the restricted angular range W1 (see FIG. 1F), and that, in the second alternative, the one or several optical layers 5b deflect the light originating from the backlight unit 2 in such a way that it is finally radiated into the restricted angular range W2 (see FIG. 1E), wherein finally, i: is in operating mode B1 (see FIG. 1F), provided that it is implemented, the light sources 4 are switched on and the backlight unit 2 is switched off;

ii: in operating mode B2 (see FIG. 1E), provided that it is implemented, the backlight unit 2 is switched on and the light sources 4 are switched off;

iii: in operating mode B3 (not shown in the drawing), provided that it is implemented, both the light sources 4 and the backlight unit 2 are switched on.

Figure 2:
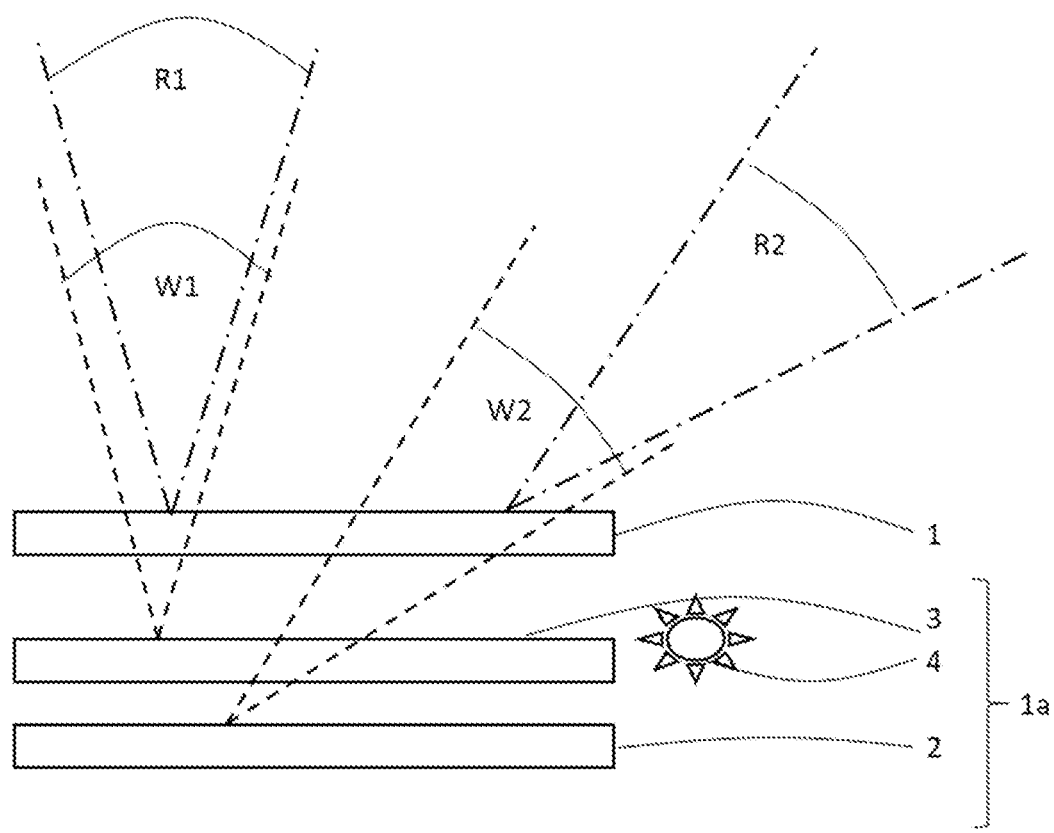
FIG. 2 is a further sketch illustrating the principle of an arrangement consisting of an illuminating apparatus and a display screen.

Irrespective of whether the first or the second alternative are implemented in the illuminating apparatus 1a, FIG. 2 shows an arrangement with an illuminating apparatus 1a and a display screen 1, as described above.

In addition here, the respective restricted angular ranges W1, W2, R1 and R2 are drawn schematically. It should be noted here that these angular ranges should equally or similarly apply at every point of the surface of the light guide 3, the backlight unit 2 and, respectively the display screen 1. Also, the angle shape merely here indicates the main propagation region of the light projected onto the drawing plane in the respective angular range, e.g., with a cut-off at 10% of the peak brightness or the FWHM.

What can be seen is the high degree of overlap of the angular ranges W1 and R1, and W2 and R2, respectively.

Figure 2A:
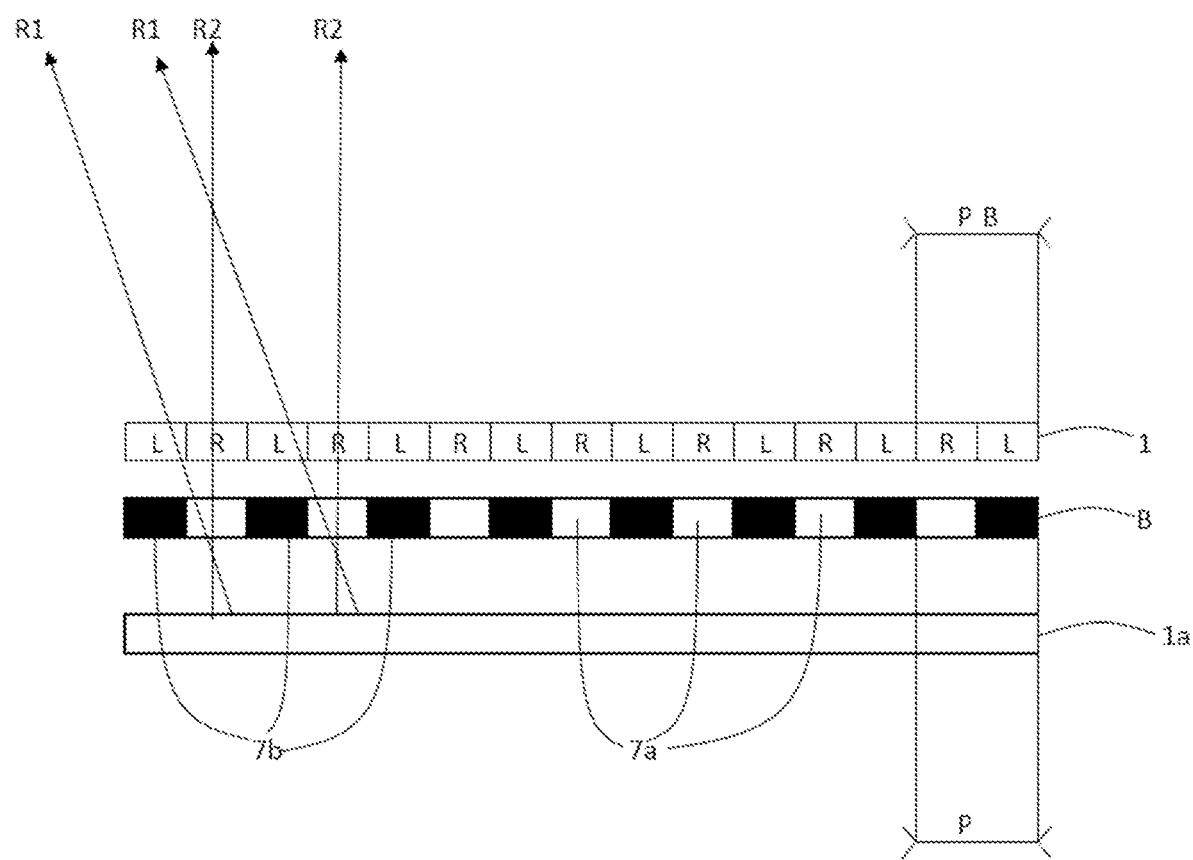
FIG. 2A is a sketch illustrating the principle of an arrangement in a first embodiment consisting of an illuminating apparatus, a barrier screen and a display screen.

With particular preference, the display screen 1 can, in the arrangement just described, be operated at least in a dual-view mode, which permits viewing, simultaneously or in a time sequence, two different images L, R from two different, at least partially disjoint angular ranges R1 and R2. Concerning this, FIG. 2A is a sketch of the principle of an arrangement in the first embodiment, consisting of an illuminating apparatus 1a, a barrier screen B and a display screen 1. Herein, in an arrangement of a first embodiment, a dual-view mode permitting viewing, simultaneously or in a time sequence, two different images L, R from two different, at least partially disjoint angular ranges R1 and R2, is implemented in such a way that a barrier screen B with a transparent-opaque pattern with a period P is arranged before or behind the display screen B, and that furthermore, if two mutually periodically interleaved image contents L, R are presented on the display screen, wherein the period PB of the interleaved image contents L, R presented on the display screen 1 tallies with the said period P except a tolerance of maximally three percent, the image contents L, R can predominantly be seen from the angular ranges R1, R2, with the illuminating apparatus operating in operating mode B3, and preferably with the angular ranges R1 and W1, or R2 and W2, respectively, overlapping to a high degree.

Figures 5, 6:
FIG. 5 is a sketch illustrating the principle of the pattern of a barrier screen.
FIG. 6 is a sketch illustrating the principle of two interleaving image contents.

Concerning this, FIG. 5 is a sketch of the principle of the embodiment of a barrier screen (or, for embodiments described below, also of a transparent-opaque pattern for a planar component 7). The period P is apparent. In principle, opaque-to-transparent duty cycles other than the 1:1 cycle shown here are also eligible, e.g., 1:2, 1:3, 1:4, 1:5 or still higher.

FIG. 6 is a simplified sketch of the principle of the interleaving of two image contents in top view. Each of the boxes shown, then, corresponds to a full-color pixel, a color subpixel, or simultaneously several color subpixels or full-color pixels, depending on the embodiment. The letters L and R designate the origin of the respective image information: either from image content L or R.

In place of the barrier screen with the period P, a prism array and/or lenticular array and/or some other suitable, direction-selective optical element such as, e.g., a hologram, can be arranged.

Figure 2B:
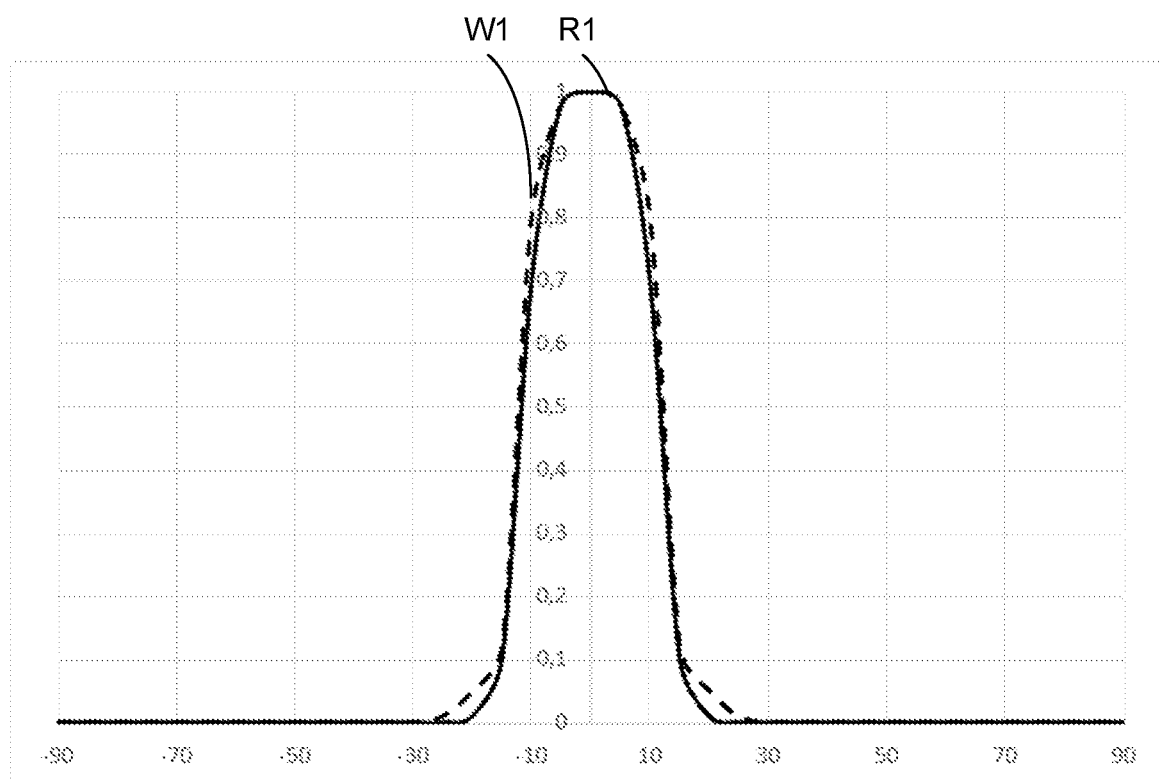
FIG. 2B is a sketch illustrating the principle of the luminance distribution of two angular ranges overlapping to a high degree, measured in a horizontal direction.
Figure 2C:
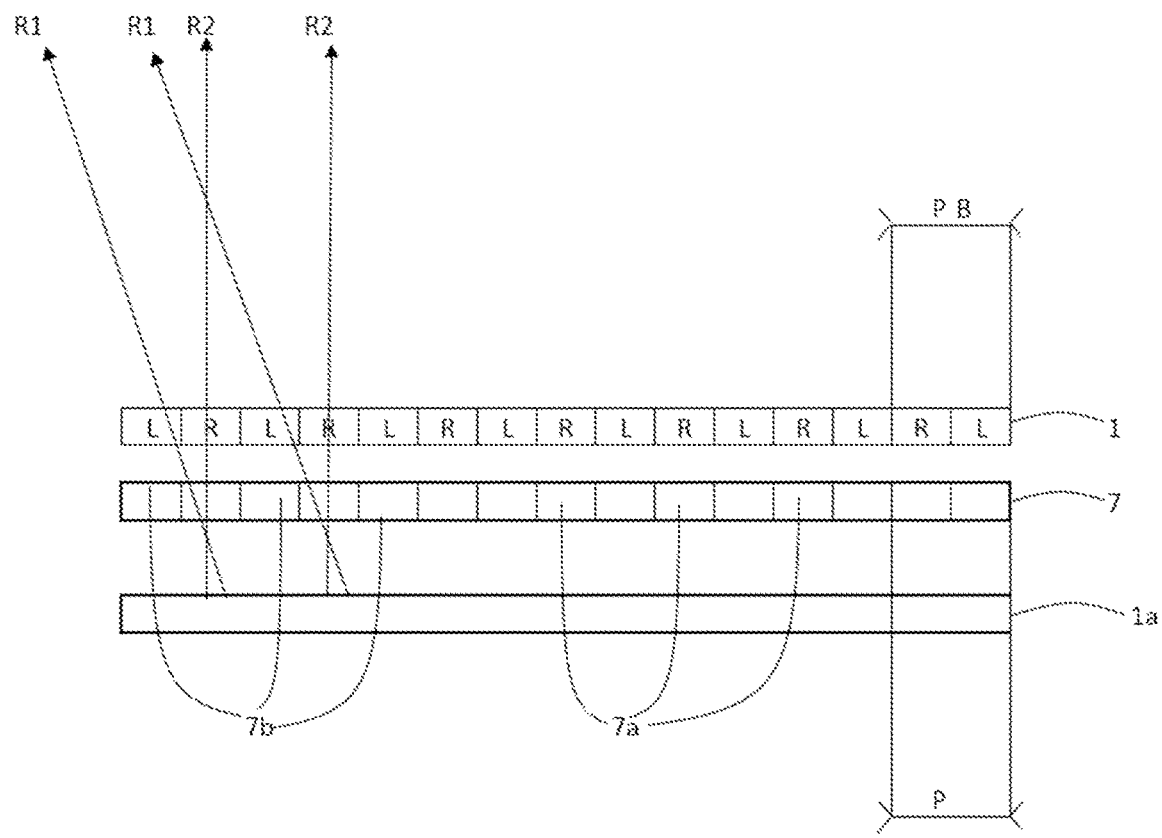
FIG. 2C is a sketch illustrating the principle of an arrangement in a second embodiment consisting of an illuminating apparatus, a planar component and a display screen.

"Overlapping to a high degree", e.g., of the angular ranges R1 and W1 is the case, if at least half of the total light amount radiated in the angular range W1 is radiated into the angular range W1. However, other definitions are possible, if necessary, with less or more than half of the said light amount. Concerning this, FIG. 2B is a sketch showing the principle of luminance distribution of two angular ranges that overlap to a high degree, measured in a horizontal direction. This drawing also shows the use of What can also be seen here is the advantage of using a dual-view panel in combination with the invented illuminating apparatus 1a: In the angular ranges f about from −20 to −30 degrees or from +20 to +30 degrees, which are important for an interference-free dual-view presentation, the illuminating apparatus provides improved channel separation, because the transmittance values of the display screen 1 and the illuminating apparatus 1a multiply, save for losses.

This first embodiment has the special advantage that the requirements regarding the backlight unit 2 or the light guide 3, respectively, i.e., to radiate the least possible residual light outside their respective angular ranges W2 or W1, can be chosen with a relatively generous tolerance. Due to the combination with a dual-view panel as the display screen 1, which itself typically exhibits little crosstalk of light between the ranges R1 and R2—mostly of a few percent only, e.g., 1% —, it is sufficient if, as described above, maximally e.g. 10% of the peak brightness of one angular range W1 or W2 is radiated into the second angular range W2 or W1, respectively. This would mean that the crosstalk of the display screen 1, here, for example, set to be 1%, is reduced by another factor of (at least) 10, since the crosstalk in the backlight unit 2 amounts to maximally 10%.

In that way, the dual mode can be markedly improved as far as crosstalk is concerned, since a direction-selective illumination is already within the scope of the illumination apparatus 1a. Nevertheless, the technical implementation of the above-mentioned exemplary demand on the invented illumination apparatus, namely that maximally 10% of the peak brightness of one angular range W1 or W2 is radiated into the second angular range W2 or W1, respectively, is markedly easier to achieve than, e.g., in privacy applications, where maximally 1% or less of the peak brightness of an angular range may get into the angular range complementary to it.

The above-described arrangement of the first embodiment can be developed into a second embodiment, as shown in FIG. 2, a sketch of a principle wherein a component 7 of planar extension, is arranged in front or behind the display screen 1 (as seen in viewing direction) and features a great number of segments 7a and 7b transmitting the light incident on it with a transmittance selectable between a maximum and a minimum value, in order to improve the black-and-white contrast by local dimming.

The surface areas of the segments 7a, 7b, which transmit light incident on them with a transmittance selectable between a maximum and a minimum, may be of nearly the same size as the surface area of a pixel or a subpixel of the display screen 1. Preferably, though, the surfaces of the segments are of a size corresponding to the size of whole clusters of pixels, so that, in case of parallel projection along the vertical bisector of the display screen 1, a segment covers a defined number of pixels of the display screen 1. These segments may, e.g. of a rectangular shape covering, in the said parallel projection, about 5×5, 10×5, 5×10, 20×20, 30×30, 10×20, 20×10, 50×50, 100×50 or 50×100 pixels. Areas of other sizes and/or shapes are possible.

With particular preference, the transmittances of the respective segments of the planar component are controlled depending on the image content shown on the display screen 1, especially by the said electronic control of the display screen 1. Due to the locally selectable transmittances, then, the purpose of the planar component with the segments is, especially, to improve the black-and-white contrast of the image, wherein a local dimming approach takes effect.

For example, the segments 7a, 7b displaying the dark parts of an image content can be triggered with a low transmittance, whereas the respective segments displaying the bright parts of an image content are triggered with a high transmittance. In prior art, many local dimming approaches have been described (e.g. in patent applications WO 2021/015710 A1, TW 201503095 A and KR 20120063940 A), and are not mentioned here, therefore.

The planar component can comprise, e.g., a liquid crystal panel with polarizers in order to achieve the defined local dimming, i.e., the setting of transmittances. If the display screen 1 is an LCD panel, one of the polarizers of the planar component can, at the same time, form a polarizer of this panel, wherein the planar component behind the display screen 1 can preferably be configured together with the latter as a/one module.

Other embodiments of the planar component are also possible, of course, using, e.g., electrochromism, electrowetting, electrophoresis, magnetophoresis or other principles acting in optical engineering.

Varying with embodiments, the transmittances achievable in the segments (if measured normal to the surface with mixed white light) are between <0.001% and 50% or more, as a rule.

Figure 3A:
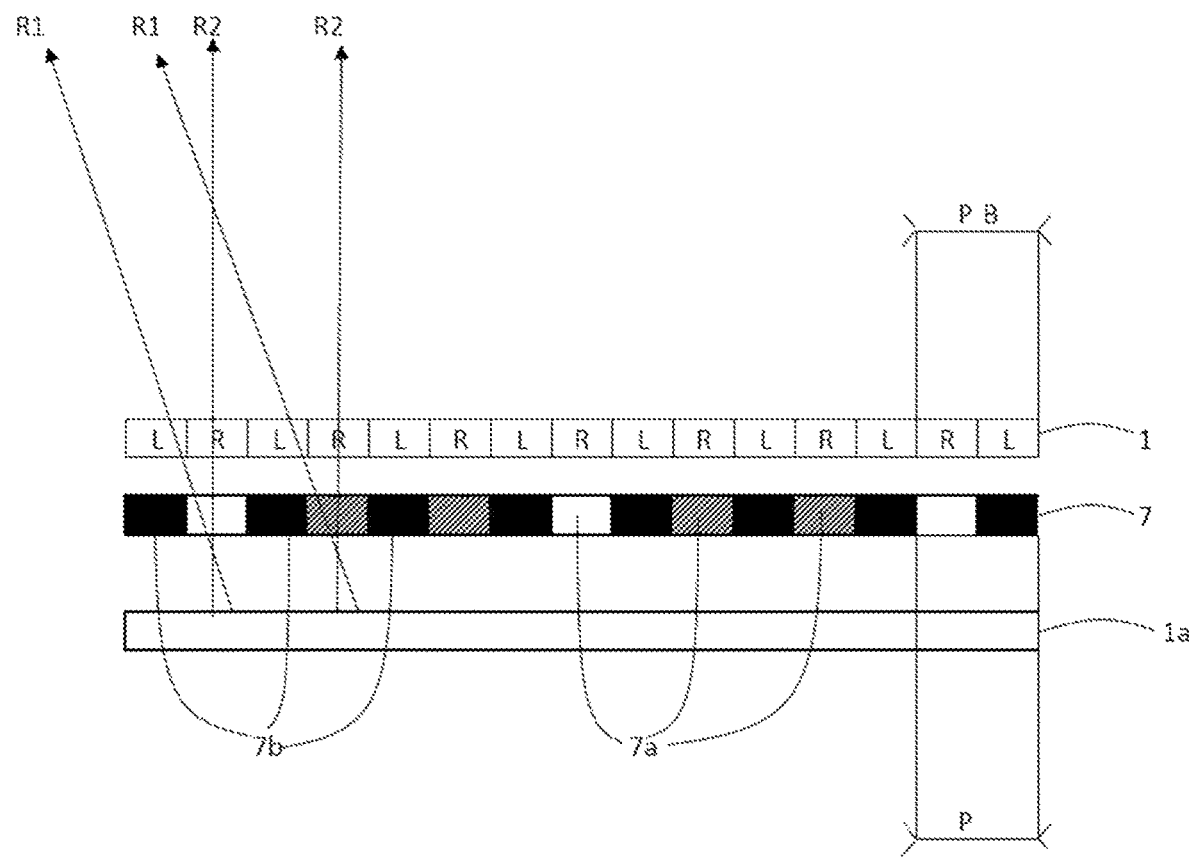
FIG. 3A is a sketch illustrating the principle of an arrangement in a third embodiment, consisting of an illuminating apparatus, a planar component and a display screen.

Further, FIG. 3A is a sketch of the principle of an arrangement in a third embodiment, consisting of an illuminating apparatus, a planar component and a display screen. This has be achieved by development from the second embodiment. In this arrangement, the planar component 7, on a genuine selection of segments 7b, represents a (transparent-)opaque pattern of a barrier screen with the period P, and implements, on a complementary selection of segments 7a, a selectable or maximum transmittance, and the period PB of the interleaved image contents L, R displayed on the display screen 1 tallies with the said period P save for a tolerance of maximally three percent, so that each of the said image contents L, R can predominantly be seen from different angular ranges R1, R2.

A "genuine" selection of segments means that you do not select all segments at a time, nor none of the segments.

Here, in a way, the planar component 7 replaces the barrier screen B of the previously described embodiment.

It should be noted here that the image contents L and R may differ from each other, but also be identical. In case of identity, different viewers staying in different angular ranges R1 and R2 will see the same image content.

Here, the explanations given above on the size of the segments apply analogously.

The said transparent-opaque pattern of a barrier screen means that the selection of segments 7b is switched to maximum transmittance, whereas the transmittance of the complementary segments 7a of the planar component 7 is selectable, this transmittance preferably being set by way of the above-mentioned local dimming mechanisms or switched to maximum transmittance to get the highest possible brightness.

The optical configuration of the prism array, the lenticular array, or the barrier screen with a transparent-opaque pattern, each with a period P, is known to the expert and is carried out especially allowing for the desired angular ranges R1 and R2, the dimensions (and positions) of the pixels of the display screen 1 and, in particular, of the period PB in interleaving the image contents L, R, the period P of the refractive indices involved (e.g., for prism and lenticular arrays, and the cover glass of the LCD panel); and the general geometric situations.

Here it is advantageous if the respective period boundaries of the prism array, the lenticular array or the barrier screen (depending on which of these is provided) in case of parallel projection tally with the period boundaries of the respective two image contents L, R mutually periodically interleaved on the display screen, save for a tolerance of maximally 300 μm, preferably maximally 100 μm.

As a mathematical relationship between the periods P and PB, one can have resort to the parallax barrier conditions known to the expert.

Here, a particularly outstanding means-effect relationship is given by the fact that the contrast-enhancing layer, i.e., the planar component 7, simultaneously contributes to the light direction selecting effect, i.e., to the optical generation of the angular ranges R1 and R2.

Figure 3B:
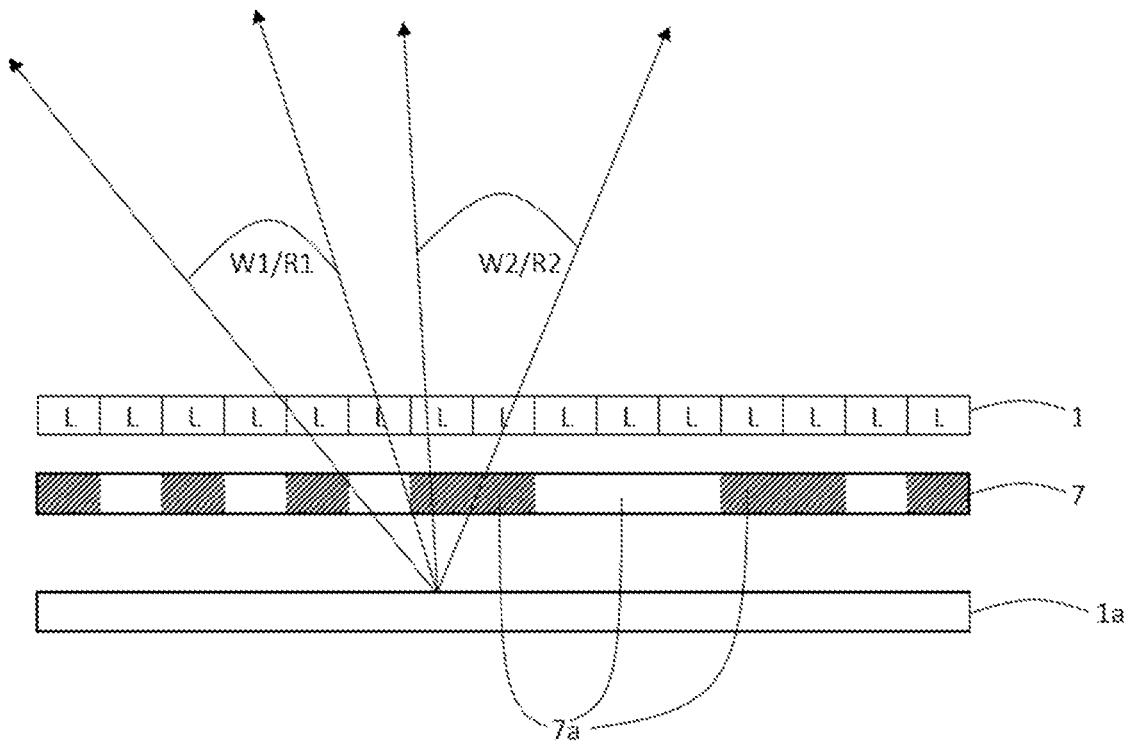
FIG. 3B is a sketch illustrating the principle of an arrangement in a third embodiment, consisting of an illuminating apparatus in operating mode B3, a planar component and a display screen.

FIG. 3B is a sketch of the principle of an arrangement in the third embodiment, consisting of an illuminating apparatus in operating mode B3, a planar component and a display screen. In an arrangement of the third embodiment, the display screen 1 can comprise an added mode, in which it displays only one image content L, wherein the planar component 7 is used as a local dimming panel and the illuminating apparatus 1a is operated in the operating mode B3. Thus, the image content L is visible fully resolved from the angular ranges R1 and R2.

The special advantage of the second and third embodiments, compared to prior art, is the fact that, due to the planar component 7, an enhanced black-and-white contrast of the image can be offered. The implementation, e.g., with a prism array and a liquid crystal panel with polarizers as a planar component can be effected at reasonable cost.

In an arrangement of the third embodiment it is further possible for the display screen to be operated in a dual-view mode, in which one image content L is dynamically freely selectable, whereas the other image content R is a selectable but static image content and preferably is a black or white or monochrome surface, wherein the illuminating apparatus 1a is operated in the B1, B2 or B3 operating mode. Depending on the visibility of the image content L in the angular range R1 or R2, then, nothing or almost nothing of the image content L would be visible in the respective other angular range R2 or R1, respectively. This non-visibility would be augmented by the fact that the image content R is a static one, which would, as far as possible, dissolve any residual light of the image content L in the angular range of the image content R.

In other words: In case of dual-view display, there is the added option that the image content R, intended actually for a front-seat passenger but, due to residual light, visible also by the person steering or controlling the vehicle (e.g. the driver), can be dissolved by means of a brighter image content L, e.g., a bright statistical image, such as a gray or multicolored area. Due to this dissolution, it can be ensured that the driver really sees nothing of the image content R not intended to be seen by him. This avoids any visual detraction of the driver by the image content R intended for a front-seat passenger.

Figure 4A:
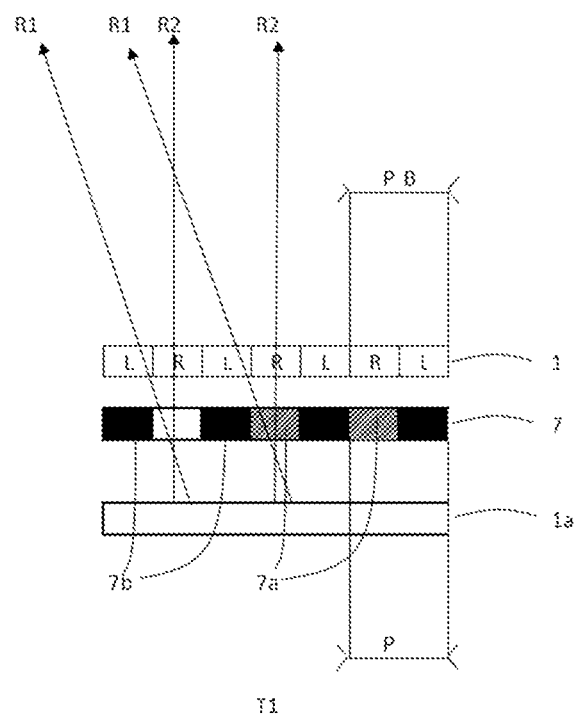
FIG. 4A is a sketch illustrating the principle of an arrangement in a fourth embodiment, consisting of an illuminating apparatus, a planar component and a display screen, shown here in clock pulse T1.
Figure 4B:
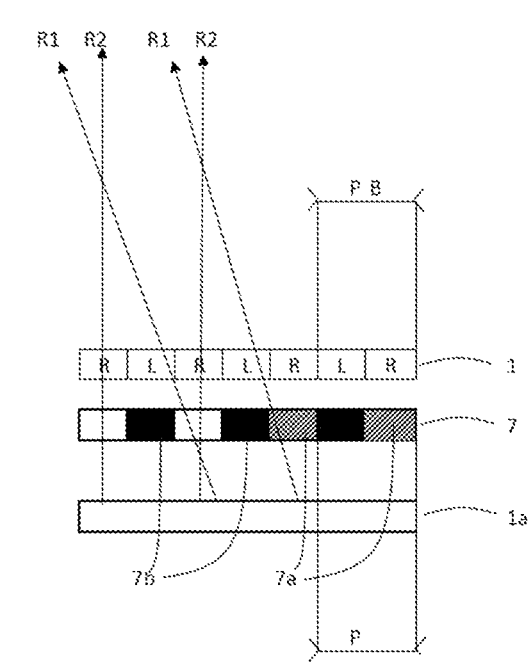
FIG. 4B is a sketch illustrating the principle of an arrangement in a fourth embodiment, consisting of an illuminating apparatus, a planar component and a display screen, shown here in clock pulse T2.

Furthermore, FIG. 4A is a sketch of the principle of an arrangement in a fourth embodiment, consisting of an illuminating apparatus, a planar component and a display screen, shown here in clock pulse T1, whereas FIG. 4B shows the same arrangement in the fourth embodiment in clock pulse T2. The second embodiment of the arrangement can be developed into a fourth embodiment, in which, for a dual-view mode permitting to sequentially view two different images L, R from two different, at least partially disjoint angular ranges R1 and R2, at least two clock pulses T1, T2 are periodically implemented in succession, with two periodically interleaved image contents L, R being displayed on the display screen 1 in each clock pulse T1, T2, and interleaving of the image contents L, R alternating between the clock pulses T1, T2, wherein a planar component 7 in front of or behind the display screen 1 displays, on a genuine selection of segments 7b, an opaque pattern of a barrier screen with the period P, and on a complementary selection of segments 7a implements a selectable or maximum transmittance, during which the said selections of segments 7a, 7b alternate between the clock pulses T1, T2, and the period PB of the interleaved image contents L, R, when displayed on the display screen 1, tallies with the said period P, save for a tolerance of maximally three percent, and the illuminating apparatus operates in operating mode B3, so that the said image contents L, R can each be seen predominantly from different angular ranges R1, R2 and, on a time average, with the display screen 1 fully resolved.

The special advantage of this fourth embodiment is the fact that both an, on average, fully resolved display and a high black-and-white contrast is achieved. Furthermore, as described above, the requirements for the illuminating apparatus with regard to the suppression of residual light are but moderately high.

The frequency at which the clock pulses T1 and T2 alternate here, should at least be 60 Hz, or preferably yet higher. This also applies to clock pulse-controlled embodiments described below.

Lastly, the second embodiment of the arrangement can be developed into a fifth embodiment, in such a way that, for a dual-view mode permitting to sequentially view two different images L, R from two different, at least partially disjoint angular ranges R1 and R2, at least two clock pulses T1, T2 are periodically implemented in succession, wherein the display screen 1 displays image content L in clock pulse T1, and image content R in clock pulse T2 (this allocation of clock pulses to image contents applies without loss of generality and can be exchanged, of course), and wherein optionally, a planar component 7 arranged in front or behind the display screen 1 (as seen in viewing direction) with segments 7a that transmit light incident on them, each with a transmittance selectable between a minimum and a maximum value, in order to enhance the black-and-white contrast by local dimming, and wherein the illuminating apparatus 2 is operated in operating mode B1 during clock pulse T1 and in operating mode B2 during clock pulse T2 (this allocation of clock pulses to operating modes applies without loss of generality and can be exchanged, of course), and whereas further preferably, the angular ranges R1 and W1 or R2 and W2, respectively, overlap to a high degree (for the definition of "overlapping to a high degree", see above, so that each of the said image contents L, R can predominantly be seen from different angular ranges R1, R2, with the display screen 1 fully resolved.

Optionally, for all embodiments of the invention described above, one of the angular ranges R1 or R2 may, at least partially include a half plane that extends through the centroid of the imaging area of the display screen 1 save for a tolerance of a few, or also quite a few, millimeters, is normal to the imaging area of the display screen 1 save for a tolerance of a few degrees, and, at the same time, is aligned parallel to the left margin of the imaging area of the display screen 1 save for a tolerance of a few degrees.

As a matter of course, all image contents L, R in all embodiments may be still images and/or moving images, text or other visual contents.

The invention also includes the use of an arrangement according to the invention or an illuminating apparatus according to the invention inside a vehicle, wherein the person steering and controlling the vehicle (e.g. the driver), provided that he is situated outside one of the angular ranges R1 or R2, sees the image content displayed in this restricted angular range R1 or R2 with maximally two percent, or preferably less than one percent, of its peak brightness.

The vehicle eligible herein may generally be a motor road vehicle, a ship, a rail-borne vehicle, an air plane or a spacecraft.

For all embodiments, the planar component 7 permits the implementation of a local dimming approach to enhancing the black-and-white contrast without the need for the backlight unit to be made locally dimmable. This is another advantage compared to prior art.

The problem specified is solved by the optical elements described:

The descriptions herein cover an illuminating apparatus and an arrangement with a display screen that enable the defined viewing of image contents from specifiable angular ranges, wherein optionally the highest possible black-and-white contrast of the image is achieved. The invention also solves the further optional target of the illuminating apparatus 1a satisfying the demands placed on it while permitting the greatest possible tolerances for the residual light in regions not intended to be illuminated.

The invention described above can be used advantageously wherever confidential data are displayed and/or entered, such as the entry of PINs or the display of data on automatic tilling machines or payment terminals, or the entry of passwords or the reading of e-mails and secret documents on mobile devices. As described farther above, the invention can also be used in vehicles, especially in automobiles.

What is claimed is:

1. An illuminating apparatus intended for a display screen and operable in at least two operating modes B1 and B2 for illuminating one of two, and/or at least one operating mode B3 for simultaneously illuminating both, at least partially disjoint angular ranges W1 and W2, comprising:

a backlight unit of planar extension, which, in a first alternative, radiates light into the restricted angular range W2 and, in a second alternative, radiates light into a restricted angular range W2a, not congruent with W2, a plate-shaped light guide that is situated in front of the backlight unit, as seen in a viewing direction, and features outcoupling elements on at least one of the large surfaces and/or within its volume, wherein the light guide is transparent to at least 70% of the light originating from the backlight unit, light sources arranged laterally on at least one of edge of the light guide, wherein a number of outcoupling elements per unit area and their extension are chosen so that the light guide, on at least 50% of its area, scatters at most 25 percent, preferably at most ten percent, of the light penetrating its large surfaces by more than ten degrees, whereby, at least in operating mode B2, the light radiated by the backlight unit into a restricted angular range W2 or W2a, when it passes the light guide, is scattered not more than slightly outside the angular range W2 or W2a, wherein a distribution of the outcoupling elements, on at least one of the large surfaces and/or within the volume of the light guide, is specified to the effect that light radiated by the light sources into the light guide and coupled out of the light guide by the outcoupling elements is radiated into a restricted angular range W1a, while at least 50% of an amount of light coupled out of the light guide is coupled out in a direction away from the backlight unit, wherein, in the first alternative, the restricted angular range W1a corresponds to the restricted angular range W1, and wherein, in the second alternative, the light coupled out of the light guide into the restricted angular range W1a is imaged by one or several optical layers situated, as seen in the viewing direction, in front of the plate-shaped light guide in such a way that it is finally radiated into the restricted angular range W1, and wherein, in the second alternative, the one or several optical layers deflect the light originating from the backlight unit in such a way that it is finally radiated into the restricted angular range W2, and wherein:
i: is in operating mode B1, the light sources are switched on and the backlight unit is switched off;
ii: in operating mode B2, the backlight unit is switched on and the light sources are switched off;
iii: in operating mode B3, both the light sources and the backlight are switched on.

2. The illuminating apparatus as claimed in claim 1, wherein the number of outcoupling elements per unit area and their extension are chosen so that the light guide, on at least 50% of its area, scatters at most ten percent of the light penetrating its large surfaces by more than ten degrees.

3. The illuminating apparatus as claimed in claim 1, wherein the outcoupling elements comprise microlenses and/or microprisms and/or diffractive structures and/or holograms and/or three-dimensional structural elements and/or scattering elements.

4. The illuminating apparatus as claimed in claim 1 with outcoupling elements provided within the volume of the light guide, wherein the outcoupling elements are configured as cavities or refractive index differences, which have an outer form of microlenses, microprisms or diffractive structures.

5. The illuminating apparatus as claimed claim 1, wherein the backlight unit comprises:
a planar radiator, preferably a light guide with light sources arranged laterally or on the rear side.

6. The illuminating apparatus as claimed in claim 5, further comprising at least one light collimator integrated in the planar radiator and/or arranged in front of it.

7. The illuminating apparatus as claimed in claim 1, wherein, for the operating mode B1, depending on the specified critical angles σ, γ, the light coupled out and exiting from the light guide at an angle β—at every point of the surface of the light guide in angular ranges satisfying the requirements 80°>β>γ and/or −80°<β<−σ, with 10°<γ<80° and 10°<σ<80° measured normal to the surface of the light guide and in at least one of the two preferred directions—exhibits maximally 80° of the luminosity of the light exiting at such a point of the surface of the light guide in any direction with maximum luminosity.

8. The illuminating apparatus as claimed in claim 7, wherein γ=σ=20°, and the light exhibits maximally 50° of the luminosity of the light exiting at such a point of the surface of the light guide in any direction with maximum luminosity.

9. An arrangement, consisting of an illuminating apparatus as claimed in claim 1 and a display screen arranged in front of it, as seen in the viewing direction, wherein the display screen comprises at least one transmissive screen, including an electronic control unit for defined display of image contents on the display screen.

10. The arrangement as claimed in claim 9, wherein the at least one transmissive screen comprises an LCD panel.

11. The arrangement as claimed in claim 9, wherein the display screen is configured to be operated in at least one dual view mode, which permits viewing, simultaneously or in a time sequence, two different images L, R from two different, at least partially disjoint angular ranges R1 and R2.

12. The arrangement as claimed in claim 11, wherein a dual-view mode permitting simultaneous viewing of two different images from different, at least partially disjoint angular ranges R1 and R2, is implemented in such a way that a prism array and/or a lenticular array and/or a barrier screen having a transparent-opaque pattern with a period P is arranged in front or behind the display screen, and that furthermore, if two mutually periodically interleaved image contents L, R are presented on the display screen, wherein a period PB of the interleaved image contents L, R presented on the display screen tallies with the period P save for a tolerance of maximally three percent, the image contents L, R can predominantly be seen from the angular ranges R1, R2, with the illuminating apparatus operating in operating mode B3, and with the angular ranges R1 and W1, or R2 and W2, respectively, overlapping to a high degree.

13. The arrangement as claimed in claim 11, wherein a planar component is arranged in front of or behind the display screen, as seen in the viewing direction, and provided with a multitude of segments which transmit light incident on them, each with a transmittance selectable between a minimum and a maximum value, in order to improve a black-and-white contrast by local dimming.

14. The arrangement as claimed in claim 13, wherein the planar component, on a genuine selection of segments, represents a transparent-opaque pattern of a barrier screen with the period P, and implements, on a complementary selection of segments, a selectable or maximum transmittance, and wherein the period PB of the interleaved image contents L, R displayed on the display screen tallies with the period P save for a tolerance of maximally three percent, so that each of the image contents L, R are visible from different angular ranges R1, R2.

15. The arrangement as claimed in claim 14, wherein the display screen comprises another mode in which it displays only one image content, wherein the planar component is utilized as a local dimming panel and the illuminating apparatus is operated in operating mode B3.

16. The arrangement as claimed in claim 14, wherein the display screen is operated in a dual view mode, in which one image content L is freely selectable in a dynamic manner, and the other image content R is selectable, but static, being a black or white or monochrome surface, with the illuminating apparatus being operated in operating mode B1 or B2.

17. The arrangement as claimed in claim 13, wherein, for a dual-view mode permitting to sequentially view two different images L, R from two different, at least partially disjoint angular ranges R1 and R2, at least two clock pulses T1, T2 are periodically implemented in succession, wherein:
in each clock pulse T1, T2, two periodically interleaved image contents L, R are displayed on the display screen, and interleaving of the image contents L, R alternates between the clock pulses T1, T2, and wherein
a planar component in front of or behind the display screen displays, on a genuine selection of segments, an opaque pattern of a barrier screen with the period P, and on a complementary selection of segments implements a selectable or maximum transmittance, during which the selections of segments alternate between the clock pulses, and wherein:
the period PB of the interleaved image contents L, R, when displayed on the display screen, tallies with the period P, save for a tolerance of maximally three percent, and the illuminating apparatus operates in operating mode B3, so that the image contents L, R are visible predominantly from different angular ranges R1, R2 and, on a time average, with the display screen fully resolved.

18. The arrangement as claimed in claim 13, wherein for a dual-view mode permitting to sequentially view two different images L, R from two different, at least partially disjoint angular ranges R1, R2, at least two clock pulses T1, T2 are periodically implemented in succession, wherein:
the display screen displays image content L in clock pulse T1, and image content R in clock pulse T2, and wherein:
the illuminating apparatus is operated in operating mode B1 during clock pulse T1 and in operating mode B2 during clock pulse T2, and wherein:
the angular ranges R1 and W1 or R2 and W2, respectively, overlap to a high degree, so that each of the image contents L, R is predominantly visible from different angular ranges R1, R2.

19. The arrangement as claimed in claim 18, wherein a planar component is arranged in front or behind the display screen as seen in viewing direction, with segments that transmit light incident on them, each with a transmittance selectable between a minimum and a maximum value, in order to enhance the black-and-white contrast by local dimming.

20. Use of the illuminating apparatus as claimed in claim 1 inside a vehicle, wherein a person steering and controlling the vehicle, when being outside one of the angular ranges R1 or R2, will see the image content displayed in this restricted angular range R1 or R2 with maximally two percent of its peak brightness.

* * * * *

UNITED STATES PATENT AND TRADEMARK OFFICE
CERTIFICATE OF CORRECTION

| | |
|---|---|
| PATENT NO. | : 11,454,841 B1 |
| APPLICATION NO. | : 17/686223 |
| DATED | : September 27, 2022 |
| INVENTOR(S) | : André Heber |

Page 1 of 2

It is certified that error appears in the above-identified patent and that said Letters Patent is hereby corrected as shown below:

In the Specification

In Column 3, Line 46, delete "is" after "i:".

In Column 3, Line 49, delete "ii." and insert -- ii: --, therefor.

In Column 3, Line 52, delete "iii." and insert -- iii: --, therefor.

In Column 4, Line 65, delete "or." and insert -- or --, therefor.

In Column 4, Line 66, delete "Furthermore" and insert -- Furthermore, --, therefor.

In Column 5, Line 41, delete "Furthermore" and insert -- Furthermore, --, therefor.

In Column 12, Line 8, delete "is" after "i:".

In Column 12, Line 11, delete "ii." and insert -- ii: --, therefor.

In Column 12, Line 15, delete "iii." and insert -- iii: --, therefor.

In Column 13, Line 61, delete "Furthermore" and insert -- Furthermore, --, therefor.

In Column 14, Line 20, delete "W1 a" and insert -- W1a --, therefor.

In Column 14, Line 28, delete "is" after "i:".

In Column 14, Line 31, delete "ii." and insert -- ii: --, therefor.

In Column 14, Line 34, delete "iii." and insert -- iii: --, therefor.

Signed and Sealed this
Sixth Day of December, 2022

Katherine Kelly Vidal
*Director of the United States Patent and Trademark Office*

CERTIFICATE OF CORRECTION (continued)
U.S. Pat. No. 11,454,841 B1

In Column 15, Line 10, delete "is" after "i:".

In Column 17, Line 44, delete "be" and insert -- been --, therefor.

In the Claims

In Column 21, Claim 1, Line 42, delete "is" after "i:".

In Column 21, Claim 5, Line 64, insert -- in -- after "claimed".